No. 644,691. Patented Mar. 6, 1900.
J. SHELLENBERGER & C. L. KING.
NESTING FRUIT BASKET.
(Application filed Oct. 23, 1899.)
(No Model.)
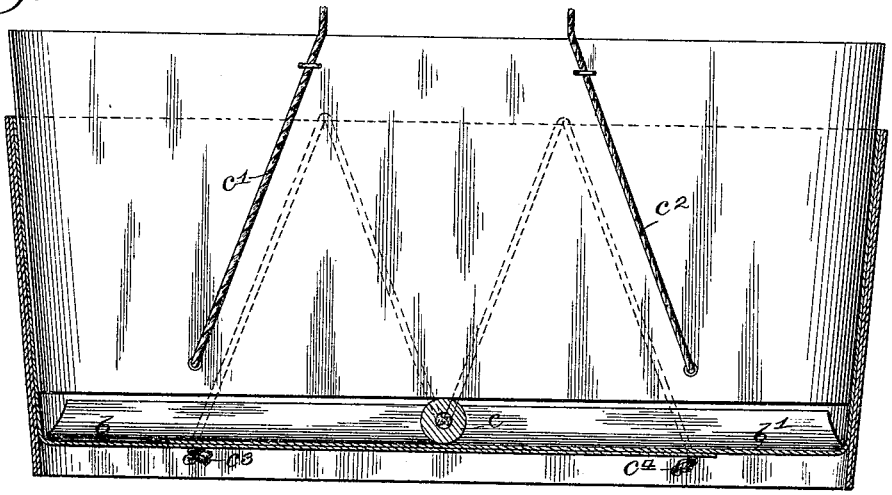
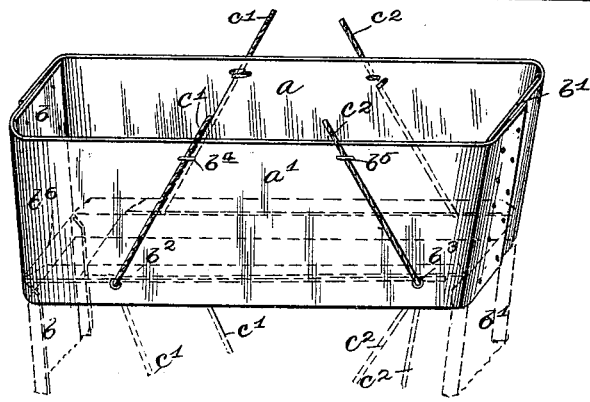
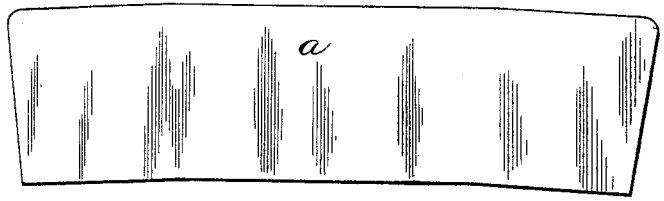
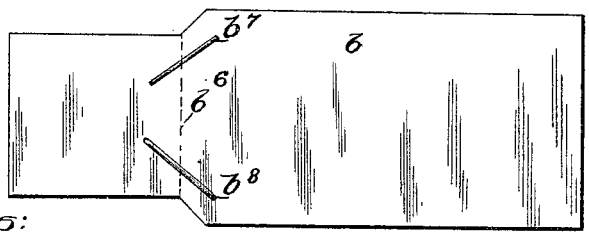
Witnesses:
R. White
Harry B. L. White
Inventors,
John Shellenberger,
Charles L. King,
By Jonee Bain Attorney

UNITED STATES PATENT OFFICE.

JOHN SHELLENBERGER, OF DAVENPORT, IOWA, AND CHARLES L. KING, OF HOLLAND, MICHIGAN.

NESTING FRUIT-BASKET.

SPECIFICATION forming part of Letters Patent No. 644,691, dated March 6, 1900.

Application filed October 23, 1899. Serial No. 734,423. (No model.)

*To all whom it may concern:*

Be it known that we, JOHN SHELLENBERGER, residing in Davenport, county of Scott, and State of Iowa, and CHARLES L. KING, residing in Holland, county of Ottawa, and State of Michigan, citizens of the United States, have invented certain new and useful Improvements in Nesting Fruit-Baskets; and we do hereby declare the following to be a full, clear, and exact description, such as will enable persons who are skilled in the art to which it appertains to make and use the same.

Our invention relates to improvements in baskets, and especially to the class of baskets that is designed for the transportation of fruit.

Our object is to provide a basket that is cheap to construct, that is strong, durable, neat in appearance, and convenient to pack.

A further object of our invention is to provide a basket that will nest one within the other, so that they may be thus made to occupy a very small space when shipping them from the factory.

A valuable feature of our invention is that our basket is made and completed at the factory, so that work of this nature is not required to be done by the shipper just prior to its being used as with other baskets of this class.

In the drawings, Figure 1 shows a perspective view of our basket. Fig. 2 is an enlarged section of two baskets one nested within the other. Fig. 3 is a blank of which the sides are formed. Fig. 4 is a blank that forms an end piece and part of the bottom.

The same letters of reference are used to indicate similar parts in the several views.

The basket shown in Fig. 1 is formed of two pieces of Fig. 3 and two pieces of Fig. 4. The pieces $a$ are bent round near the ends, so as to form a round-cornered basket. This construction is to be preferred to the usual square-cornered basket, as being stronger and more handsome in design, and this feature forms the subject-matter for another application filed of even date herewith. The pieces $a$ and $b$ are tacked, stapled, or otherwise fastened together at the ends of the basket, the piece $b$ being preferably on the inside of the basket and reinforcing the ends at the joint. The piece $b$ is scored across at the line $b^6$, so that the widened extension may be readily bent up into the bottom of the basket, as shown in section in Fig. 2.

The cords or wires $c'$ and $c^2$ are two separate loops of preferably soft pliable wire, which are threaded through a wooden bail-handle $c$, and their respective ends are then passed through the sides of the basket a short distance from the bottom, as shown at $b^2$ $b^3$. An additional fastening, such as a staple, may be driven over the wire into the sides of the basket to secure it in position. The entire weight of the basket is carried by the wire handles. There is no strain on the body or any part of the basket.

When it is desirable to nest the baskets one within the other, the bail-handle $c$ is first depressed into the hollow of the basket, to which it is attached by the wires $c'$ $c^2$. The wire being very pliable and not very large easily conforms to the position. In this manner a great many baskets made and completed at the factory may be made to nest one within the other and may then be crated for shipment. In baskets with the ordinary wooden handles it is necessary to ship them nested and nail the handles on after they are received by the users.

The tops of the baskets may be fastened on in any suitable manner, and in the use of our basket the tops should be attached before the basket is filled with fruit.

When filling our basket, it should be turned with the bottom up. The flaps shown broken off in dotted lines in Fig. 1 should be opened, as therein shown. Then the most select fruit may be tastefully arranged within the basket upon the top. When the basket has been filled, the flaps should be turned in. Being hinged by the effect of the score $b^6$ to the ends of the basket they may be readily turned in. The widest portion of the flap is wider than the basket. They should be turned down toward the top of the basket, so that when the basket is in an upright position the two flaps $b$ $b'$ form, with the bottom portion, an inverted arch. The shrinkage of the bottom piece is all taken up by these flaps, so that when they are made sufficiently wide there will be no cracks in the bottom of the basket as a result of such a shrinkage. As soon as the flaps are turned in in the manner described the two ends of the wires $c'$ $c^2$ should be twisted together, as shown at $c^3$ $c^4$ in Fig. 2. The wires may be easily and quickly twisted together and serve to hold the bottom in place, and by this means are themselves held in place.

For the purpose of reinforcing the corner at the score $b^6$ we prefer to bridge the said score with two thin flexible wire staples $b^7$ and $b^8$, as shown in Fig. 4, placed in a position oblique to the grain of the wood. These staples are placed on the score side, and while the piece $b$ is flat the staples are driven through the piece $b$ and clenched on the other side. When the piece $b$ is bent at right angles at the score $b^6$, the wires $b^7$ and $b^8$ will cut into the corners thereby produced and afford a very substantial means for strengthening the said corners. The wires may be placed before shipment and will not interfere in any way with stacking the pieces $b$.

It will be noticed that the bottom of our basket does not extend to the bottom of the side pieces forming the body part. The effect of this construction is to protect the contents of the basket from being subject to injury or destruction by coming in contact with hard or unyielding substances on which the basket may be placed.

It is of course apparent that the sides of the basket may be made of a single piece and that the corners may be made square instead of round without departing from the gist of our invention.

Having described our invention, what we claim as new, and desire to secure by Letters Patent of the United States, is—

1. A basket comprising side and end walls, bottom pieces operatively hinged at opposite walls adapted to overlap each other, and a wire passing under said bottom pieces for securing them in place, substantially as set forth.

2. A basket comprising side and end walls, pieces adapted to form the bottom thereof attached to opposite walls, hinges in said pieces, and a wire passing under said bottom pieces for securing them in place, substantially as set forth.

3. A basket comprising side and end walls, pieces adapted to form the bottom thereof attached to opposite walls, hinges in the said pieces, a bail-handle, and a wire, carrying said handle and passing under said bottom pieces for securing them in position, substantially as set forth.

4. A basket comprising side and end walls, a bottom piece formed into an inverted arch, a handle comprising flexible wires carrying a bail-handle, perforations in the side walls of said basket through which said wires pass, and a means for fastening said wires under said bottom for securing said bottom in position, substantially as set forth.

5. A basket comprising side and end walls, a bottom for said basket not entirely held in place by the structure thereof, and two wires passing under said bottom and jointly forming a handle above said basket, whereby the entire weight of said basket is carried by said wires, substantially as set forth.

6. A blank for forming a box or basket, scores or attenuant lines across the grain thereof, wires placed obliquely to the grain of said blank and bridging said scores, before the blank is bent, the ends of said wires extending through said blank and bent back on the opposite side, substantially as set forth.

7. A basket comprising side and end walls, a blank for the bottom wider than the space between the side walls of said basket, adapted to be attached to opposite walls thereof, and upturned flaps, or portions, of said basket, said upturned portions sufficiently wide to provide for shrinkage, substantially as set forth.

In testimony whereof we have signed this specification, in the presence of two subscribing witnesses, this 16th day of October, 1899.

JOHN SHELLENBERGER.
CHARLES L. KING.

Witnesses:
ISAAC MARSILJE,
MAUDE G. MARSILJE.